Figure 1:
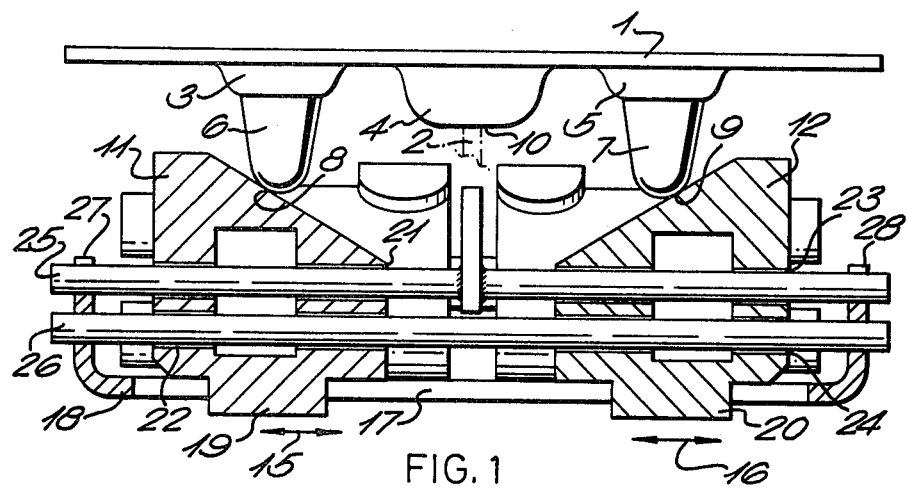

United States Patent [19]

Longland

[11] 4,167,306
[45] Sep. 11, 1979

[54] REAR VIEW MIRROR ASSEMBLY

[75] Inventor: Peter A. Longland, Chichester, England

[73] Assignee: Britax (Wingard) Limited, England

[21] Appl. No.: 863,021

[22] Filed: Dec. 21, 1977

[30] Foreign Application Priority Data

Jan. 7, 1977 [GB] United Kingdom ............ 540/77

[51] Int. Cl.² ............................................. G02B 5/08
[52] U.S. Cl. .................................................. 350/289
[58] Field of Search ........................ 350/285, 288, 289

[56] References Cited

U.S. PATENT DOCUMENTS

| | | | |
|---|---|---|---|
| 2,806,408 | 9/1957 | Moeller | 350/289 X |
| 3,199,075 | 8/1965 | Simmons | 350/289 X |

*Primary Examiner*—F. L. Evans
*Attorney, Agent, or Firm*—Steele, Gould & Fried

[57] ABSTRACT

A remotely adjustable mirror assembly in which a reflective member is supported on a tilting mechanism which includes a pair of selectively movable ramped cams. The cams are coupled to gripper devices to grip or release a member which is reciprocated by a pair of alternately energized solenoids. The gripper devices are also solenoid operated and include either a recessed head or a double-gag plate head to grip or release the reciprocating member. A multiposition, joy-stick operated switch provides eight operating modes for selectively adjusting the position of the member in azimuth, or elevation, or both. A pulse generator producing two trains of oppositely phased pulses is connected through the multiposition switch to the solenoids for the reciprocating member. Two types of switch are described.

21 Claims, 23 Drawing Figures

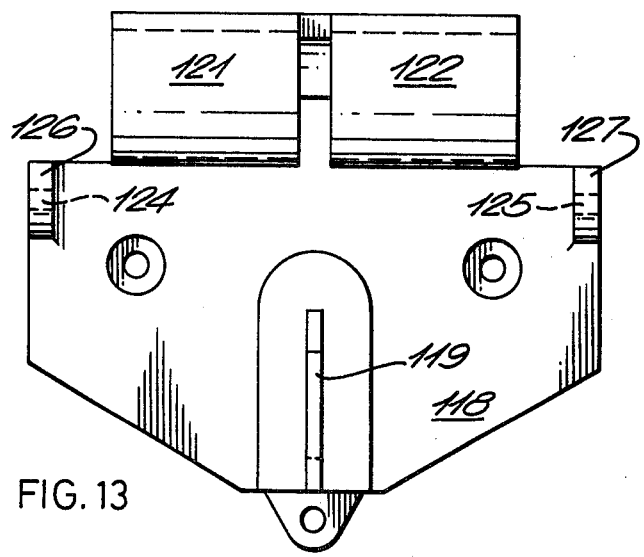
FIG. 13
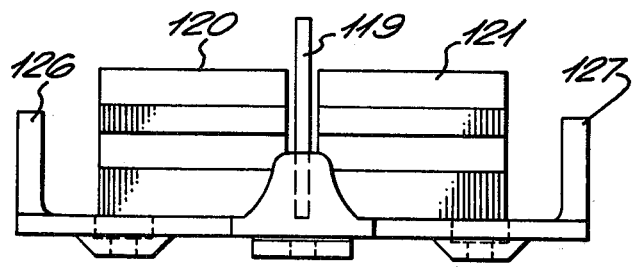
FIG. 14
FIG. 15
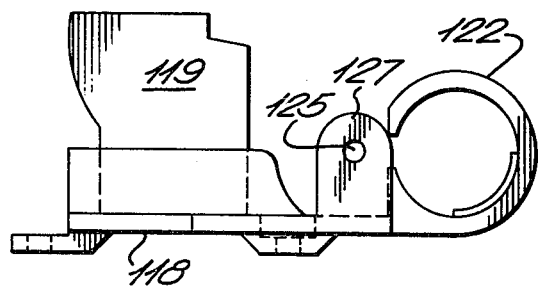

REAR VIEW MIRROR ASSEMBLY

This invention relates to an electrically operable and remotely adjustable mirror assembly. The assembly enables the remote adjustment of a reflective member, by electrical means, to provide a rear view on a vehicle.

It is known to provide a remotely adjustable mirror assembly which includes a mirror head or casing fitted externally of a vehicle and housing a reflective member which can be orientated by means of a tilting mechanism connected to an electrical motor by a reduction gear. Such an assembly is expensive to produce due to the cost of the motor and the reduction gear. There is also a greater change of jamming and mulfunction of rotating parts when they are miniaturised to form an assembly which will fit into the mirror head or casing. Moreover, if the known assembly includes a tilting mechanism so that the reflective member pivots simultaneously in two perpendicular planes, it is not possible to operate a remote control for separate azimuthal and elevational adjustment of the reflective member when the assembly is fitted to the vehicle.

The present invention provides a remotely adjustable mirror assembly which is electrically operable but which does not employ an electrical motor or a reduction gear. Instead, the invention uses a plurality of solenoids, as a stepping mechanism, for adjusting the position of a reflective member for either azimuthal, or elevational adjustment, or both. The solenoids can be miniaturised with less chance of a malfunction or jamming which is experienced with rotating parts. Moreover, the assembly according to the invention can be made smaller than a motorised assembly so that it is suitable for installation in a wider variety of mirror heads or casings.

More particularly, the present invention provides a remotely adjustable mirror assembly comprising reflective means; supporting means for supporting said reflective means at three points which define triangle, said supporting means including selectively movable cam means at two of said points; solenoid means for providing a drive to adjust the position of said cam means; releasable engagement means for selectively connecting the drive of said solenoid means to said cam means; and a remote control for selectively energising said solenoid means whereby said reflective means is capable of combined elevational and azimuthal adjustment as well as separate elevational and azimuthal adjustment.

The solenoid means may include first and second solenoids which reciprocate a common armature. The common armature may be connected to a member which is either engaged or released by said releasable engagement means. Preferably, the releasable engagement means comprises third and fourth solenoids which operate respective and releasable means for engaging or releasing said member. For example, an armature of each third and fourth solenoids may have a head with a recess therein through which said member passes. The respective first or second solenoid is then energised so that the head either engages, or releases said member. According to one embodiment, the head has an aperture and a groove for respectively engaging the movable member connected to the common armature and a fixed member which is mounted adjacent and parallel said movable member. In another embodiment, the movable member passes through aligned holes in the arms of a V-shaped flexible strip which acts as a form of double gag plate. Each of the third and fourth solenoids has an armature with a head attached thereto for varying the angle of the V-shaped strip to cause the edges of the apertures to grip, or to release the movable member.

The remote control may be connected to means for providing antiphase phase electrical pulses for operating said solenoid means and said releasable engagement means. A suitable antiphase pulse generator for use with the assembly comprises a bimetallically operated switch, first and second relay means, the coils of said first and second relay means being connected as respective parallel branches to said bimetallically operated switch and the contacts of said first relay means being connected in series with the coil of said second relay means, said second relay means having changeover contacts for supplying antiphase pulse trains.

A suitable remote control for use with the assembly comprises a multiposition electrically switch including support means, a ball and socket joint mounted on said support means, a lever which extends from the ball, a plurality of contacts arranged about an axis passing through the ball, a plurality of contact members mechanically linked to the ball so that movement of said lever to any one of a plurality of predetermined positions causes at least one of said contact members to make an electrical connection with at least one of said contacts, and switching means operable to make a further electrical contact when said lever is placed in one of its predetermined positions.

With the above remote control, the lever is pushed into one of its predetermined positions to make the required electrical connection between the antiphase pulse generator and said third and fourth solenoids of the releasable engagement means. Such lever movement may automatically close said switching means, or said switching means may be selectively closed by, for example, a push button, to energise said first and second solenoids for reciprocating the common armature. This enables the respective cam means to be selectively moved, or left in position, to produce the required azimuthal and/or elevational adjustment of said reflective means.

The reflective means, such as a mirror attached to a backing plate, is preferably supported on two wedge-shaped cams which are slidably mounted, on a base plate, for movement on a common axis. The third point of said triangle may be fixed and provided by an upstanding member attached to, or integral with said base plate.

Suitably, the reflective means and the mechanism for making azimuthal and elevational adjustment is housed in a casing which is supported on an arm or mounting bracket on the exterior of the vehicle. The reflective means may be fitted to the casing by a conventional resilient bezel and/or sealing ring and the casing may be mounted on the arm or bracket by means of a flexible gaiter. Alternatively, the reflective means, such as the mirror proper, has a periphery which is received in a flexible gaiter attached to a surrounding rim of a relatively fixed casing.

Figure 2:
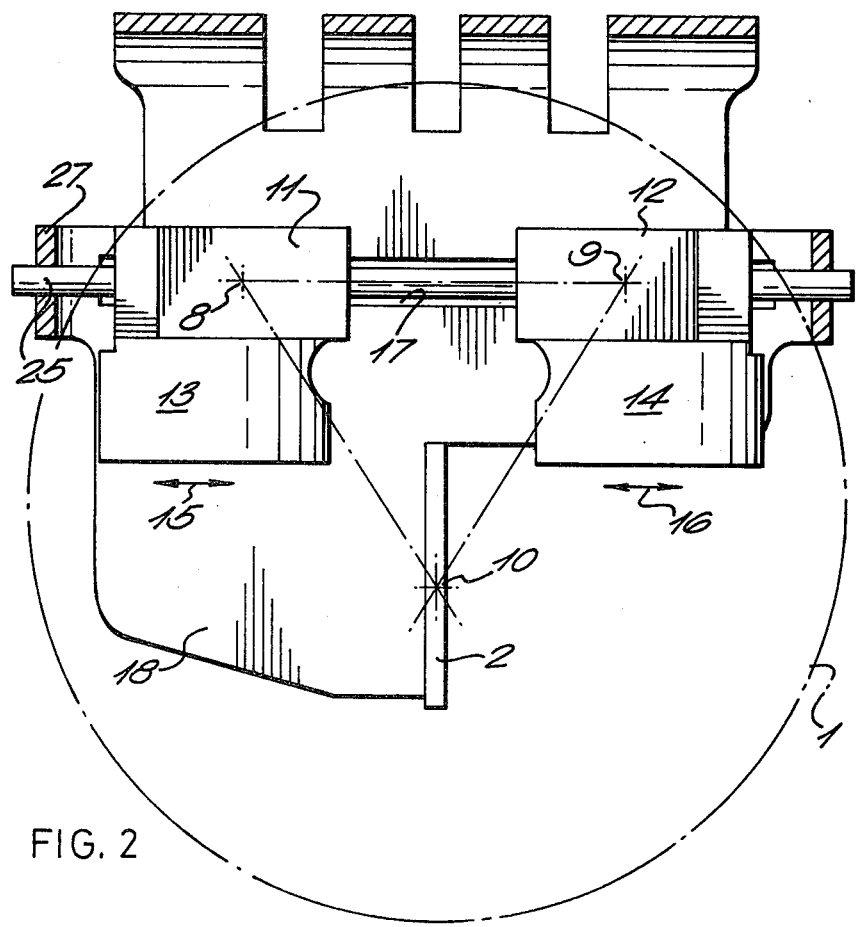
Figure 3:
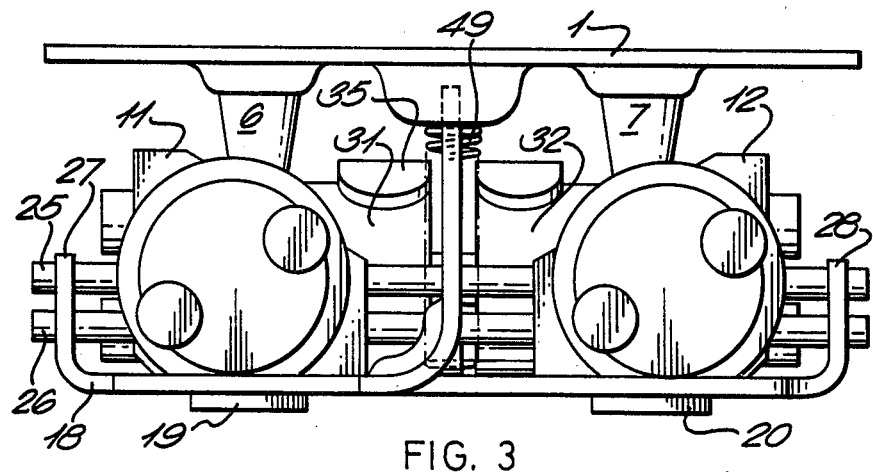
Figure 4:
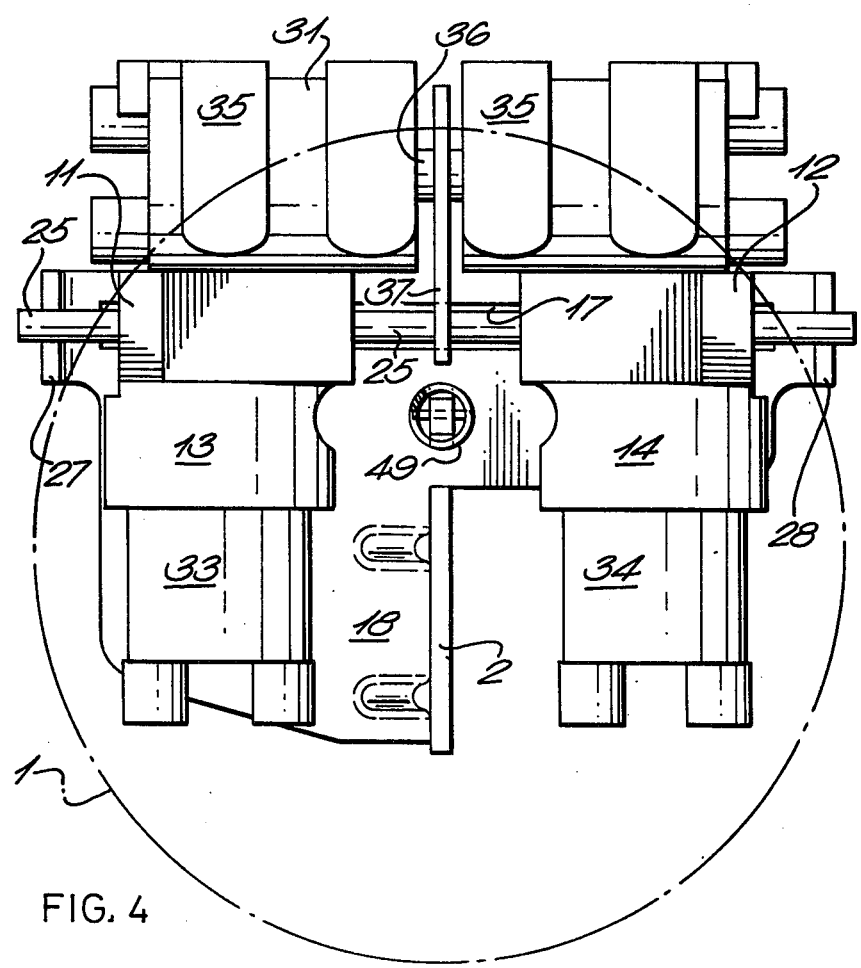
Figure 5:
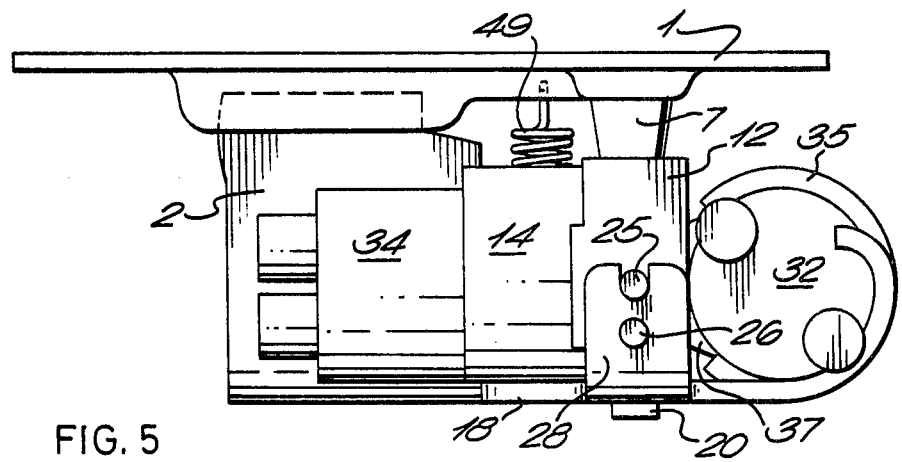

Preferred embodiments of the invention will now be described with reference to the accompanying drawings, in which:

FIG. 1 is a sectional elevation of part of a remotely adjustable mirror assembly according to one embodiment of the invention, FIG. 2 is a plan view, partly in section, of the subassembly shown in FIG. 1, FIG. 3 is an elevational, similar to FIG. 1, and showing the subassembly with solenoids fitted thereto, FIG. 4 is a plan view of FIG. 3, FIG. 5 is a side elevation of the subassembly shown in FIGS. 3 and 4, FIGS. 6 and 7 are side elevation and plan views respectively, showing the details of a releasable engagement device used in the subassembly of FIGS. 3–5, FIG. 8 is a schematic circuit diagram of a remote control for operating the solenoids shown in the subassembly of FIGS. 3–5, FIG. 9 is a sectional elevation of a remote control switch according to one embodiment of the invention.

Figure 9:
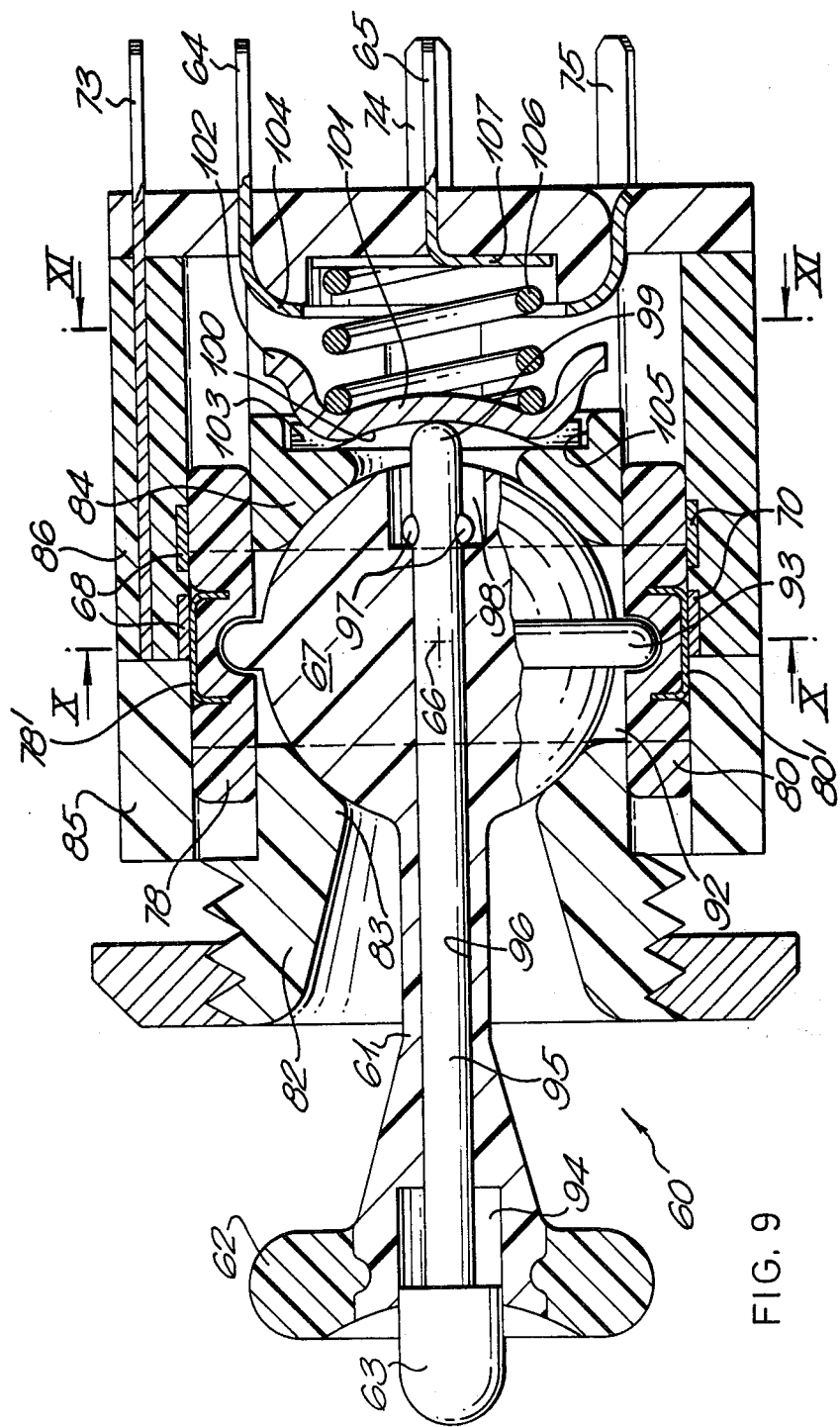
Figure 10:
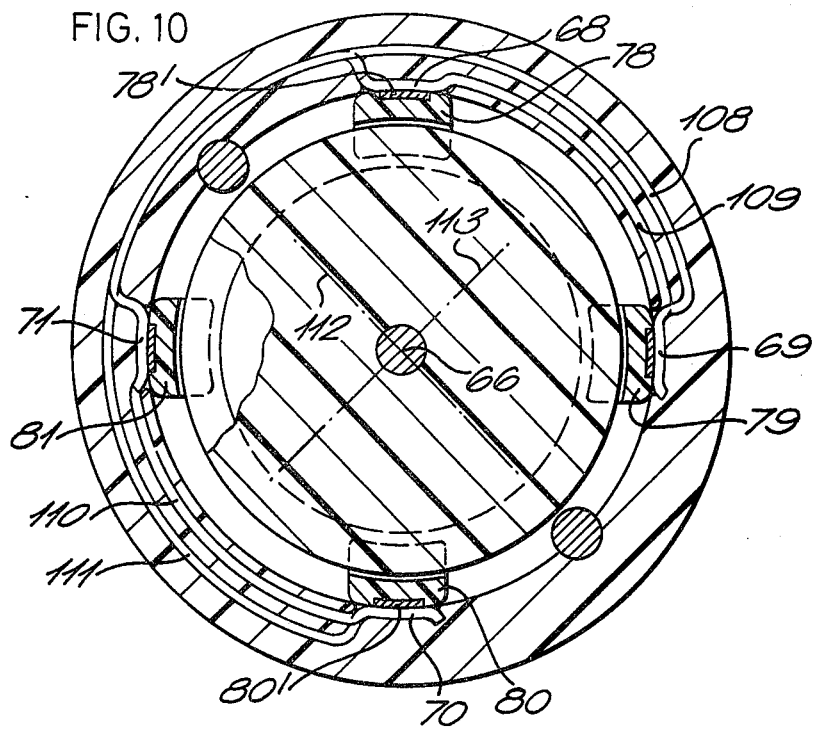
Figure 11:
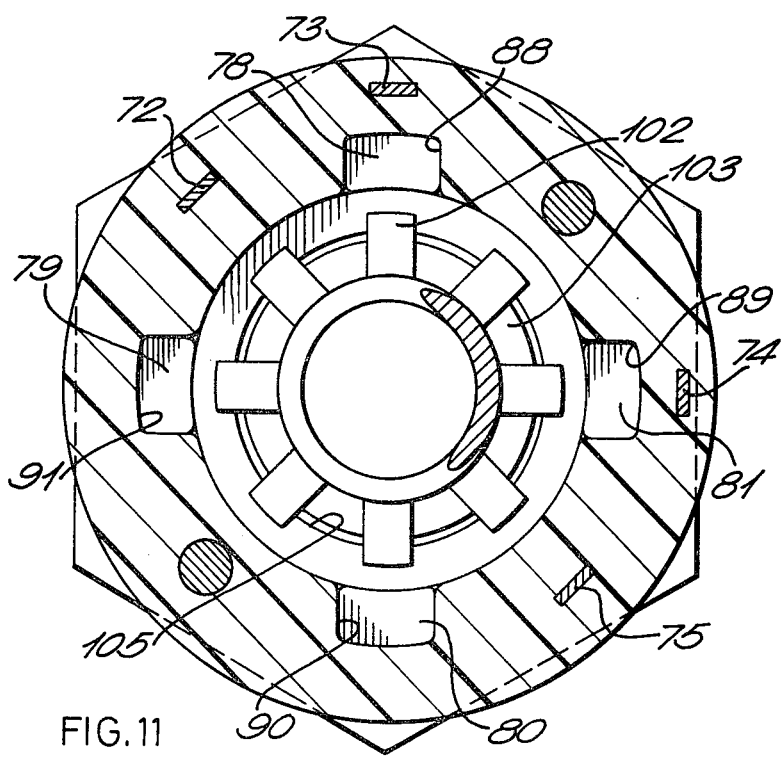
Figure 12:
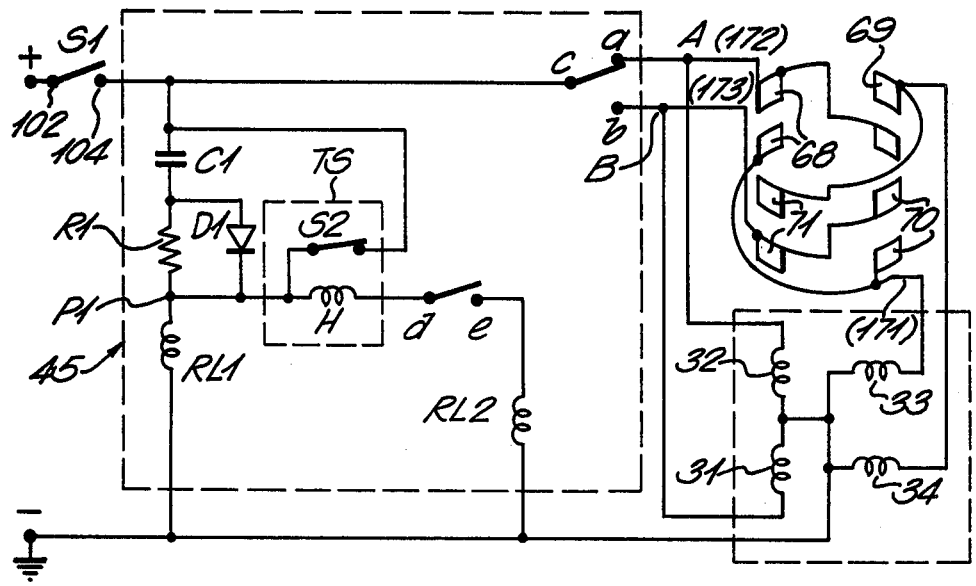
Figure 22:
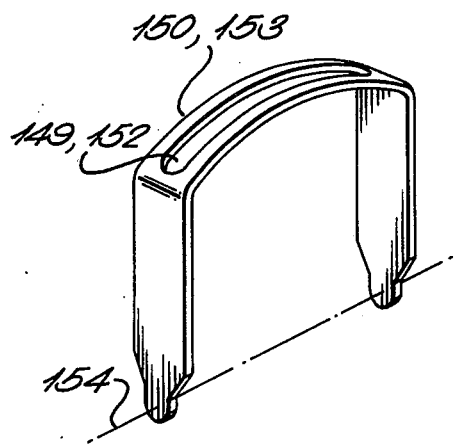
Figure 16:
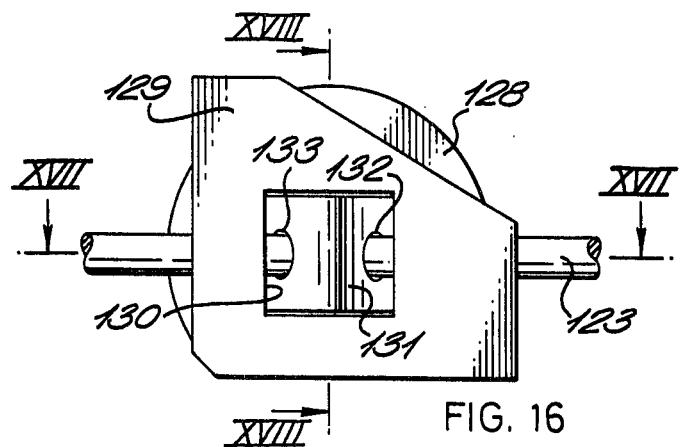
Figure 17:
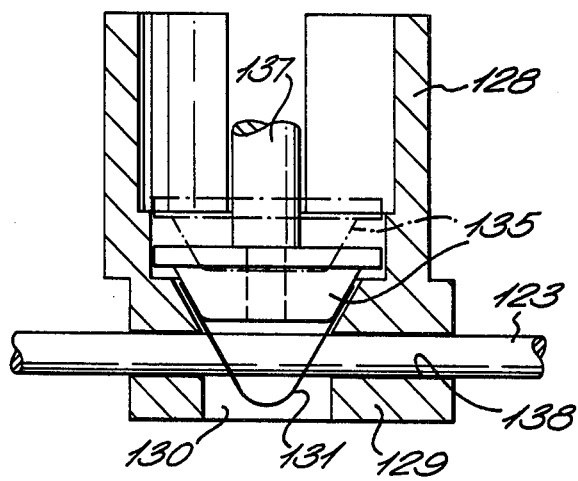
Figure 18:
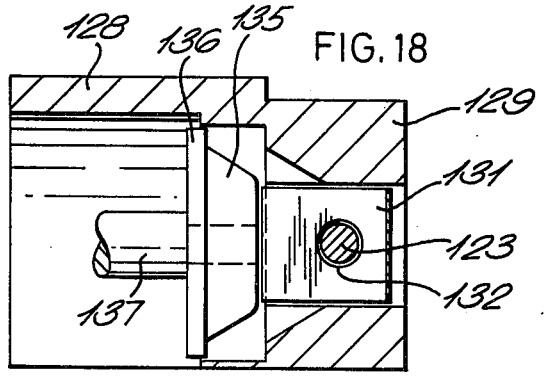
Figure 19:
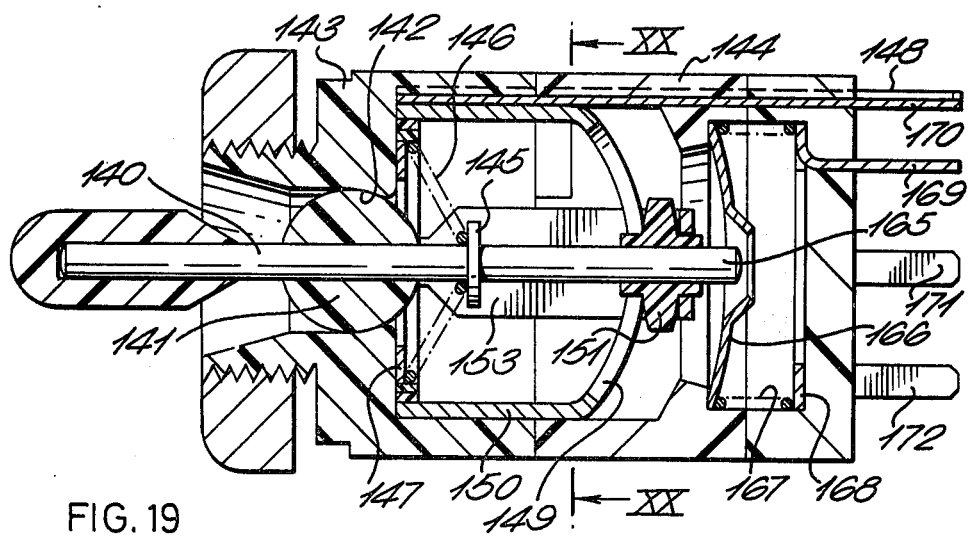
Figure 21:
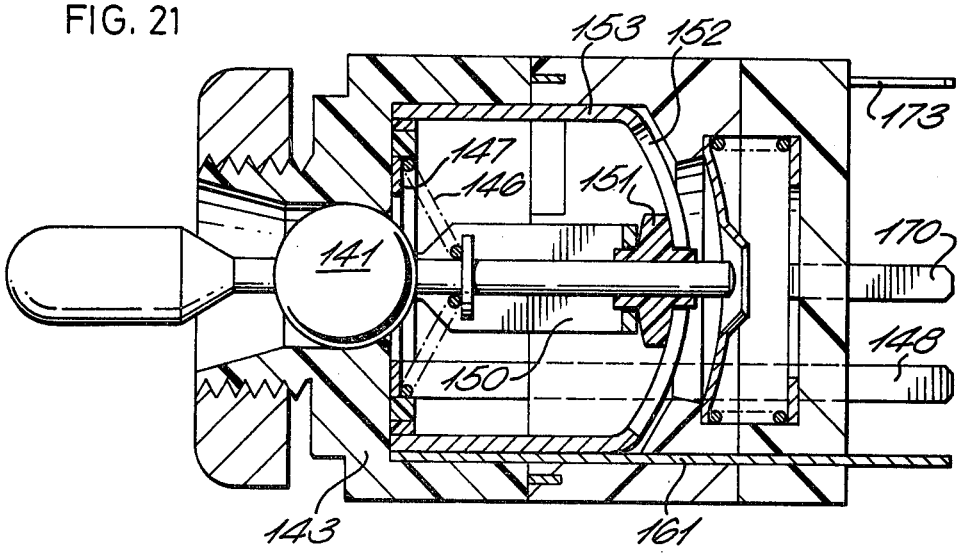
Figure 20:
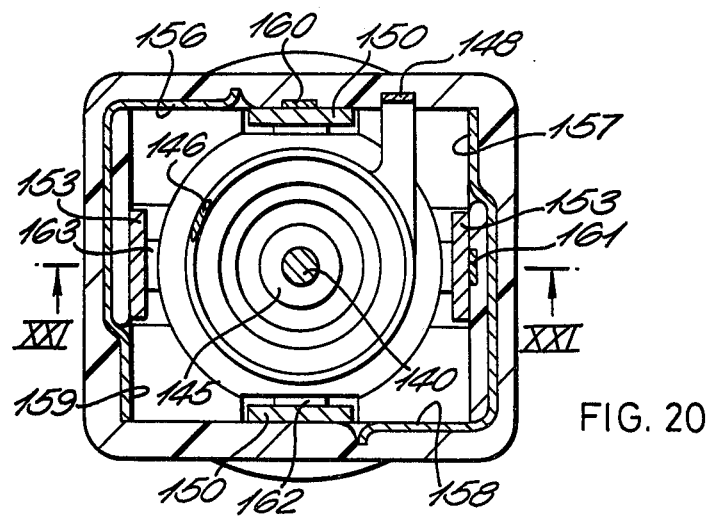

FIGS. 10 and 11 are respective sections on the lines X—X and XI—XI of FIG. 9,

FIG. 12 is a circuit diagram showing a pulse source, switching contacts of a remote control and the solenoids in more detail, FIGS. 13, 14 and 15 are respective plan, front elevation and side elevation views of a base plate subassembly according to another embodiment, FIG. 16 is a front elevation of a gripper device according to another embodiment, and used in the subassembly shown in FIGS. 13–15, FIGS. 17 and 18 are respective sections on the lines XVII—XVII and XVIII—XVIII, FIG. 19 is a sectional elevation of a remote control according to another embodiment, FIG. 20 is a section on the line XX—XX of FIG. 19, FIG. 21 is a section on the line XXI—XXI of FIG. 20, FIG. 22 is a perspective detailed view of one of two stirrups used in the control of FIGS. 19–21, and FIG. 23 is a sectioned view of an exterior subassembly according to the invention and showing a mirror attached to a tilting mechanism and mounted within a casing which is supported on a mounting bracket.

Figure 23:
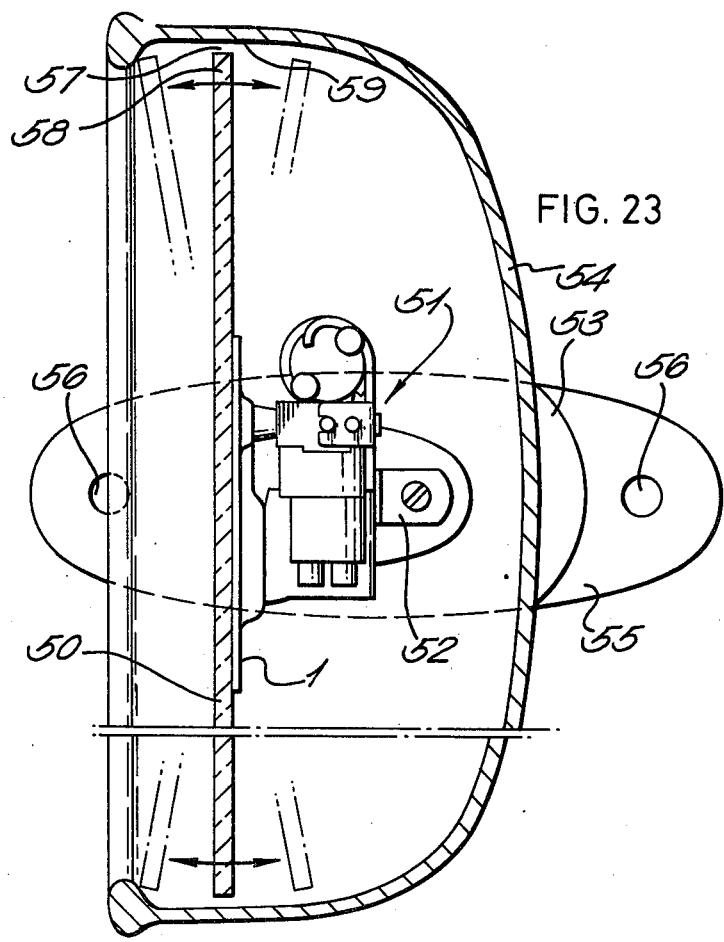

The rear view mirror assembly according to the preferred embodiment of the invention includes a subassembly which is mounted on the exterior of a vehicle (i.e. the "external subassembly"), a remote control which is mounted interiorly of the vehicle (.i.e."the interior remote control"), and electrical conductors, such as wiring, which connects the external subassembly to the interior remote control. Whilst FIG. 23 illustrates the external sub-assembly according according to the preferred embodiment, a description will first be given, with regard to FIGS. 1 and 2, of a mechanism for tilting a reflective member or mirror which is housed in a casing forming part of the external sub-assembly.

Referring to FIGS. 1 and 2, a circular backing plate 1 supports a reflective member (not shown). The backing plate 1 has three protuberances 3, 4, 5 on a rear surface thereof. Cone shaped members 6, 7 are attached to the respective protuberances 3, 5. The protuberance 4 and the members 6, 7 rest on respective points 8, 9, 10 which define a triangle shown by the chain and dot line in FIG. 2. Points 8, 9 are points of contact between the members 6, 7 and respective ramped or wedge-shaped cams 11, 12. These cams, which are integral with cylindrical solenoid housings 13, 14, can be independently reciprocated in the directions of the arrows 15, 16. Such movement occurs along the longitudinal axis of a slot 17 in a base plate 18. The cams 11, 12 are provided with depending parts 19, 20 which are slidably located in the common slot 17. Each cam 11, 12 is also provided with a pair of bores 21, 22 and 23, 24 which slidably receive respective rods 25, 26. Rod 25 is slidably received in upturned portions 27, 28 of base plate 18. Rod 26 is fixed to the upturned portions 27, 28.

The point 10 is a point of contact between the protuberance 4 and the upper edge of an upturned member 2 of base plate 18. Unlike the points of contact 8, 9, the point of contact 10 is fixed.

If either cam 11, or cam 12 is separately moved in the directions of the respective arrows 15, 16, the backing plate 1 (and hence a reflective member attached thereto) will tilt about a respective axis passing through points 9, 10 or 8, 10. If both cams 11, 12 are moved simultaneously, the backing plate 1 will tilt about an axis which is the resultant of the combined cam movement. For example, if both cams 11 and 12 were symmetrically spaced from point 10 and were moved towards each other, or away from each other at the same speed, the backing plate 1 would tilt about an axis passing through point 10 and parallel with the longitudinal axis of the slot 17. Whilst the backing plate 1 could itself be reflective, a reflective member is preferably attached thereto which is of a suitable size to fit a casing as shown in FIG. 23 (described below).

The cams 11, 12 are moved by means of a solenoid arrangement and gripper devices which will now be described with reference to FIGS. 3–7.

As shown in FIG. 4, solenoids 31, 32 are secured on the base plate 18 by curved fingers 35 which are integral therewith. Fingers 35 define aligned circular recesses in which the cylindrical body of each solenoid is tightly fitted. The solenoids 31, 32 share a common armature 36 which is fast with a transmission member 37. Member 37 is fast with the movable rod 25. Thus, if solenoid 31 is energised, the armature 36 is attracted and the rod 25 moves to the left of the drawing. Likewise, if solenoid 32 is energised, the armature 36 is attracted and the rod 26 moves to the right of the drawing. This movement is selectively transmitted to each of the cams 11, 12 by means of gripping devices shown in FIGS. 6 and 7.

Referring to FIG. 4, cams 11 and 12 are integral with cylindrical solenoid housings 13, 14. Solenoid 33 is tightly fitted to housing 13 and solenoid 34 is tightly fitted to housing 14.

Figure 6:
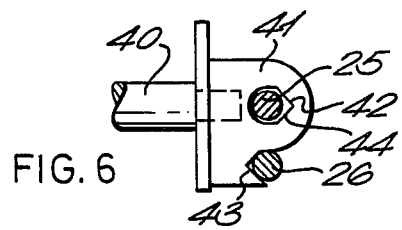
Figure 7:
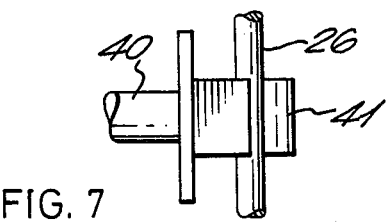

Referring to FIGS. 6 and 7, each solenoid 33, 34 is provided with an armature 40 which is attached to a rubber head 41 having a pair of oppositely directed notches, 42, 43. Notch 42 is defined by an aperture 44 in the head 41. Aperture 44 receives the movable rod 25. Notch 43 lies opposite the fixed rod 26.

When the respective solenoid 33, 34 is energised, the armature 40 is attracted whereby notch 42 is held hard against the rod 25 and the notch 43 is held clear of rod 26. Then, the entire sub-assembly of, for example, solenoid 33, housing 13 and cam 11 is secured to the movable rod 25 for movement therewith. When the solenoid 33 is de-energised, the armature 40 returns under spring bias (not shown) so that notch 43 is held hard against rod 26 and rod 25 is clear of notch 42 and the edges of the aperture 44. The latter mentioned sub-assembly is then held in a stationary position on the fixed rod 26. The gripper device of solenoid 34 operates in the same way.

Figure 8:
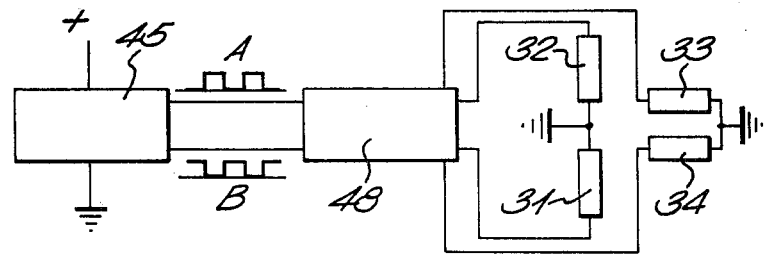

Referring to FIG. 8, a pulse source 45 generates pulses shown by phase A and phase B when source 45 generates positive going pulses having a repetition frequency of 1 per cycle, the pulses in phase A are 180° out of phase with those in phase B. These pulses are supplied via a first switch (described later) to solenoids 31, 32 and via a second or eight position switch (described later) to solenoids 33, 34. The first and second switches are schematically represented by box 48 in FIG. 8, which represents, for example, a joy-stick type of control as described below.

When the position of the reflective member, attached to backing plate 1, is adjusted, pulses of current are continuously supplied, in phases A and B, to solenoids 31 and 32. This causes the movable rod 25 to oscillate continuously. The second switch has eight positions for selectively connecting solenoids 33 and 34 to either phase A or phase B of the pulse source 45 or for disconnecting them from the source. Table 1 below indicates such a supply of pulses to solenoids 33, 34 and the corresponding movements of the backing plate 1 and hence a reflective member attached thereto, such as member 50 of the mirror head shown in FIG. 23.

Referring to Table 1 below, the position of the arrow in the column labelled "Movement of the Reflective Member" corresponds with the required azimuthal or elevational adjustment of the reflective member attached to backing plate 1 when the assembly is mounted on a vehicle. For example, the arrow pointing vertically upwards indicates an elevational adjustment causing the reflective member to tilt vertically upwards. An arrow pointing horizontally to the right indicates an azimuthal adjustment whereby the reflective member scans to the right of the observer. The switch positions enable an electrically controlled, remotely adjusted mirror assembly to cause combined elevational and azimuthal adjustment as well as separate elevational and azimuthal adjustment of a reflective member.

Referring to FIGS. 4 and 5, a spring 49 is attached to the centre of the underside of backing plate 1 and to the baseplate 18 so as to maintain contact between members 6, 7 and cams 11, 12 and between protuberance 4 and member 2.

FIG. 23 is a sectional plan view of the external subassembly of the preferred embodiment. The reflective member 50 is attached to backing plate 1 of the tilting mechanism indicated generally by reference numeral 51. Mechanism 51 is attached by a bracket 52 to the top of an arm 53 which supports a casing 54. The base of arm 53 is attached to a mounting bracket 55 provided with fixing holes or concealed studs 56 to fix the subassembly on the body of a vehicle. The reflective member may move relative to the casing 54 and, in this case, a gap or a clearance 57 is provided between the peripheral edges 58 and 59 of the reflective member 50 and casing 54 respectively. Alternatively, the mirror head, including casing 54 and reflective member 50 tilts relative to arm 53 and a flexible gaiter or seal (not shown) joins the lower part of the casing to the top of the arm 53.

Referring to FIGS. 9-11, a joystick type of control 60 may be used with appropriate contacts whereby the input motion of a lever 61 gives the required adjustment of reflective member 50. For example, the lever 61 has a handle or knob 62 fitted with a push button 63, the button being depressed to make contact between pins 64, 65 which are connected so as to energise the pulse source 45. Lever 61 can be moved into one of eight radial switching positions, which are evenly and circumferentially spaced about the centre 66 of a ball 67 forming part of a ball and socket joint. Such movement of the lever selectively makes and breaks four pairs of contacts 68-71 which are connected to pins 72-75 for energising solenoids 33 and 34. The making and breaking of contact pairs 68-71 is effected by sliding movement of contact carriers 78-81 as explained below.

Referring more particularly to the device shown in FIG. 9, the ball 67 forms part of a ball and socket joint of which the socket is partly defined by a sleeve-shaped portion 82 with an inwardly directed neck 83, and by an annular dished portion 84. Parts 82 and 84 are integral with the respective parts 85, 86 of a two part housing. The housing is made in two parts so as to define aligned and spaced channels which slidably receive and locate the contact carriers 78-81. These channels are identified by reference numerals 88-91 in FIG. 11 which shows a section through the right hand part 86 of the housing. Similar channels (not shown) are provided in the left hand part 85 of the housing, which channels are aligned with the channels 88-91. An annular space 92 between the channels in the respective parts 85, 86 accommodates tilting movement of an annular rib 93 which is integral with the ball 67. The annular space 92 is bounded by the ends of the respective and aligned channels which are shown by broken lines in FIG. 9.

Push button 63 is mounted in a recess 94 in handle 62. Button 63 is connected to a rod 95 which is slidably located in a bore 96 in rod 65 and ball 67. The end of rod 95 has deformations 97 accommodated in a wider bore 98, to secure the rod to the ball. The end 99 of rod 95 is radiused so as to ride smoothly over a dished recess 100 in a star-shaped member 101. Referring to both FIGS. 9 and 11, the star-shaped member 101 contains a series of projections 102, 103 which extend in the respective directions shown in FIG. 9. Projections 102 are provided for engaging an annular contact 104 when button 63 is depressed. Projections 103 abut a side of an annular recess 105 provided in one end of the annular portion 84. A push button return spring 106 is provided between a head 107 of pin 65 and the star-shaped member 101. Member 101 and spring 106 are conductive so that electrical contact is made between pins 64, 65 when button 63 is depressed and one or more projections 102 engage the annular contact 104.

As shown in FIG. 10, the contact pairs 68-71 are connected to conductors 108-111 which are connected to the pins 72-75. The operation of these contacts is described below with reference to FIG. 12.

By way of an example of use, if the knob 62 is pressed downwardly, with regard to the elevation shown in FIG. 9, then ball 67 rotates about centre 66 and the annulus 93 causes contact carriers 78, 80 to move in opposite directions. Each contact carrier is provided with a bridging piece such as 78', 80' which, in the case of carrier 80, bridges the respective contact pairs 70 to make an electrical circuit. If the contact carrier 78 moves away from contact pairs 68, no connection is made at that point. As for the contact pairs 69, 71, which lie on a horizontal axis passing through centre 66, no movement of the corresponding contact carriers 79, 81 takes place and therefore no connection is made. It can be seen from FIG. 9, that the contact carriers (such as 78, 80) are not in the position to make a connection between the respective contact pairs (such as 68, 70), when the lever 61 is in a "neutral" position. Such a "neutral" position applies to the contact pairs and contact carriers which, in the example above, lie on an axis which is perpendicular to the direction of movement of lever 61. Hence, the lever 61 can be moved towards the contact pairs in order to make a selective electrical connection at that point. However, if the lever 61 is moved on a diagonal path, such as that indicated by the broken lines 112 or 113 in FIG. 10, between adjacent contact pairs, then an electrical connection will be made at both of the contact pairs adjacent the path of movement of the lever. In the latter case, diametrically opposite contact pairs do not lie on an axis which is perpendicular to the direction of movement of lever 61. Therefore, an electrical connection may be selectively made at either one or two adjacent contact pairs in accordance with the direction of movement of lever 61.

Member 101 is dished and contains eight projections 102 whereby depression of button 63 will always make a contact between pins 64, 65 at each of the eight switching positions for lever 61. These positions correspond substantially with the positions of the circumferentially spaced contacts 102 as shown in FIG. 11.

The lever 61 may be moved into any one of its eight switching positions, or it may be rotated in a circle which defines the base of a cone having an apex at centre 66. When rotated in a circle, each pair of contacts 68–71 is selectively connected, singly and in adjacent pairs. However, until the button 63 is depressed to energise pulse source 45, no mirror movement takes place.

In practice, the joystick control is fitted to the interior of the vehicle so that the direction of movement of lever 61 effectively corresponds with the direction of required mirror movement. For example, if the lever is moved up or down, this would produce a corresponding elevational adjustment of the mirror. Likewise, movement of the lever from side to side would result in corresponding azimuthal movement of the mirror. Movement of the lever on diagonal paths, between these vertical and horizontal movements (such as diagonals 112 and 113 of FIG. 10) would produce corresponding compound elevational and azimuthal mirror movement. This is related to Table 1 as described below wherein "Movement of the Reflective Member" is shown with respect to the energisation of solenoids 33 and 34.

FIG. 12 is a more detailed circuit diagram of the pulse source 45 and the contacts 68–71 which are made and broken by movement of the lever 61 and of the contact carriers 78–81 (not shown) of the joystick control, and contacts 102, 104 (shown as the poles of a switch S1) which are made and broken by depressing and releasing push button 63.

The pulse source 45, indicated by the broken lines, comprises a thermally operated bimetallic switch TS, which may be of the type used in vehicle flashing light indicators. Switch TS includes contacts operated by a bimetallic member and a heater coil H, the contacts being shown as switch S2. The operation of switch TS is such that the energised coil H heats the bimetallic member which then moves so as to open the contacts of switch S2 whereby coil H is de-energised. When the bimetallic member cools, it moves back to its starting position to close switch S2. This cycle is continuously repeated.

Switch S2 is connected to a positive line which interconnects contact 104 of switch S1 and a common contact c of a relay RL2. Coil H is connected through either the closed contacts d and e of relay RL1 and the coil of relay RL2, or the coil of relay RL1, to a negative or earth line. Thus, when switch S2 is closed, the coil of relay RL1 is energised, contacts d, e close, and the positive line voltage is supplied through changeover contacts c, b. When switch S2 is open, the coil of relay RL1 is deenergised and contacts d, e are opened. The coil of relay RL2 is then de-energised and the positive line voltage is supplied through contacts c, a. Thus, a stepped output, corresponding with the square wave pulses of phase A (FIG. 8), appears at contact a. Conversely, antiphase and square wave pulses of phase B appear at contact b. A typical pulse repetition frequency is 5–15 Hz but the actual frequency used will depend on the displacement, in steps, of the cams 11, 12 to give the desired mirror movement.

Capacitor C1, diode D1, and resistor R1 are provided to suppress radio interference due to the opening and closing of the thermal switch S2.

The cycle of operation is repeated as long as contacts 102, 104 are made.

The pulse trains in phases A and B are supplied to the contact pairs 68 and 71, which contact pairs are interconnected as shown with contact pairs 69 and 70. The sliding contact carriers, which bridge the respective contact pairs 68–71, have not been shown in FIG. 12 (for greater clarity). However, these are merely operable to bridge a selected pair or selected adjacent pairs, of the contacts 68–81 as described above. The solenoids 31–34 are connected to the contact pairs 69 and 70 as shown. The energisation of these solenoids is indicated in Table 1 below.

Table 1

| Solenoid Connections to Phase A or B or disconnected | | Movement of the Reflective Member |
| --- | --- | --- |
| Solenoid 33 | Solenoid 34 | |
| A | Not connected | ↑ |
| A | B | ↗ |
| Not connected | B | → |
| B | B | ↘ |
| B | Not connected | ↓ |
| B | A | ↙ |
| Not connected | A | ← |
| A | A | ↖ |

FIGS. 13–18 illustrate parts of an alternative embodiment. In this embodiment, substantially the same principle of operation applies with regard to the movement of wedge shaped cams (such as cams 11, 12 of FIGS. 1 and 2) to tilt a backing plate (such as plate 1) on which a reflective member is mounted. However, the gripping device is of a different construction to that described with reference to FIGS. 6 and 7.

As shown in FIGS. 13–15, this embodiment comprises a base plate 118, made of plastics material such as acetal, in which is planted a metal rib 119 which forms one of the three supports for a backing plate such as plate 1 of FIG. 1. A pair of curved extensions 121, 122 are provided for locating solenoids 31, 32. Solenoids 33, 34 are located in respective housings which are integral with wedge shaped cams as described below with reference to FIGS. 16–18. A single rod 123 (FIGS. 16–18) is slidably supported in holes 124, 125 in each of a pair of spaced arms 126, 127.

Referring to FIG. 16, the solenoids 33, 34 are received in respective and part cylindrical housings, such as housing 128. The housings are integral with respective cams, such as cams 11 and 12 of FIG. 1. In this embodiment, by way of example, housing 128 is integral with a wedge shaped cam 129. Each cam has a recess 130 to accommodate a V-shaped, spring steel gripping member 131 having the action of a double gag plate. The V-shaped member 131 has a pair of aligned holes 132, 133 as shown in FIG. 18. Normally, member 131 flexes so as to decrease the angle of the V whereby a clearance is provided between the edges of holes 132, 133 and the rod 123. Rod 123 is thereby free to move in and out of holes 132, 133 in accordance with the reciprocating action caused by solenoids 31, 32 as in the previous embodiment. However, in this case, only one rod, which is movable, is provided and this is linked to a common armature for the solenoids 31, 32.

A conical plastics plug 135 holds a metallic flange 136 to a rod 137 which forms a flux path and armature for the respective solenoid 33, or 34. When the solenoid 33 or 34 is de-energised, a return spring (not shown) causes the rod 137 to move rearwardly of housing 128 and away from the V-shaped member 131. This releases the housing 128 and cam 129 from the rod 123. Sufficient clearance is provided between the walls of a bore 138 in cam 129 and the rod 123 so that reciprocal movement of the rod does not displace the cam 129. There may be some friction (as between the foot 19 of each cam and the sides of slot 17 in the embodiment of FIG. 1) to prevent movement of cam 129 by rod 123.

When the respective solenoid 33, or 34 is energised, the armature is attracted so as to move rod 137 towards the V-shaped member 131 thereby inserting plug 135 between the arms of the V. This increases the angle of the V and causes respective parts of the edges of holes 132, 133 to grip the rod 123 in the manner of a gag plate. A V-shaped member is provided so that the arms are inclined in opposite directions to provide a gag plate grip on the rod 123 for the respective direction of movement of rod 123.

FIGS. 19-22 illustrate a joystick control according to a further embodiment. A lever 140 is pivoted by a ball 141 located in a recess 142 at one end of a two part housing 143, 144. The lever 140 is made of conductive material and has a flange 145 which locates the end of a conical spring 146. The other end of spring 146 is seated on a conductive annulus 147 which is connected to pin 148. Lever 140 passes through an insulated bush 151 which allows it to pass through a slot 149 in a conductive stirrup 150 and through a slot 152 in another conductive stirrup without electrical contact. The stirrups 150, 153 are substantially perpendicular to one another with the lever 140 passing through a hole defined by the superimposed and perpendicular slots. FIG. 22 is a perspective view of one of the stirrups and it shows an axis 154 about which the stirrup pivots when the lever 140 is moved transversely thereto. The pivoting axes 154 are closely adjacent the plane of an end wall 155 of the housing 143.

Referring to FIG. 20, which is a section on line AA of FIG. 19, a series of contact pads 156-159 line respective parts of the walls of the rectangular housing 143. Another series of contact pads 160-161 engage the pivoting feet of the respective stirrups 150, 153. Thus, if the lever 140 is tilted in the longitudinal direction of the slot in one of the stirrups, the other stirrup will pivot about its feet and engage the respective one of the contact pads 156-159. An electrical circuit will therefore be made between the respective contacts 160 or 161 and that one of the contact pads 156, 159, which is engaged by the respective stirrup. If the lever 140 is moved on a diagonal path, i.e. on one or other of the diagonals of the square section of housing 143 shown in FIG. 20, a compound stirrup movement results wherein two of the contact pads 156-159 are electrically connected to the respective contacts 160 or 161.

When the lever 140 is tilted, its end 165 makes contact with a conductive dished spring retainer 166. Retainer 166 is electrically and mechanically connected by a spring 167 to a conductive base 168 which is integral with terminal 169. This establishes an electrical contact between pins 148 and 169 which is equivalent to the contact made by depressing the push button 63 in the embodiment described above with respect to FIG. 9. Pins 170 and 171 are in contact with stirrups 150 and 153 via contacts 160 and 161; pins 172 and 173 are respectively connected to contact pad pairs 157, 158 and contact pad pairs 156, 159.

The joystick control of the embodiment shown in FIGS. 19-22 can be connected to the circuit of FIG. 12 by connecting the pins 170-173, as shown in brackets, between the contacts a, b of the pulse source 45 and the respective solenoids 31 to 34.

The joystick control described with reference to FIGS. 9-11, or to FIGS. 19-22 can be considered as a separate invention for the purpose of a divisional application.

The pulse source 45 described with reference to FIG. 12 for producing antiphase pulses, may also be considered as a separate invention for the purpose of a divisional application.

What we claim is:

1. A remotely adjustable mirror assembly comprising reflective means; supporting means for supporting said reflective means at three points which define a triangle, said supporting means including selectively movable cam means at two of said points; solenoid means for providing a drive to adjust the position of said cam means; releasable engagement means for selectively connecting the drive of said solenoid means to said cam means; and a remote control for selectively energising said solenoid means whereby said reflective means is capable of combined elevational and azimuthal adjustment as well as separate elevational and azimuthal adjustment.

2. An assembly according to claim 1 wherein said solenoid means includes first and second solenoids which reciprocate a common armature.

3. An assembly according to claim 2 wherein the common armature is connected to a member which is either engaged or released by said releasable engagement means.

4. An assembly according to claim 3 wherein the releasable engagement means comprises third and fourth solenoids.

5. An assembly according to claim 4 wherein each of said releasable means comprises a head fixed to an armature for the respective third or fourth solenoid, said head having a recess therein which receives said member and being movable, by said armature, so as to engage or release said member.

6. An assembly according to claim 5 wherein said head contains an aperture therethrough and a groove therein for respectively engaging the member which is moved by the common armature of the first and second solenoids, and a fixed member adjacent said movable member.

7. An assembly according to claim 4 wherein said releasable means each comprise a V-shaped flexible strip having a pair of aligned apertures therein which receive said member, each of the third and fourth solenoids having an armature with a head attached thereto for varying the angle of the V-shaped strip to cause the edges of said apertures to grip, or to release said member.

8. An assembly according to claim 1 wherein said remote control is connectable to means for providing antiphase electrical pulses for operating said solenoid means and said releasable engagement means.

9. An assembly according to claim 8 wherein said remote control is connected to an antiphase pulse generator, said generator comprising a bimetallically operated switch, first and second relay means, the coils of said first and second relay means being connected as respective parallel branches to said bimetallically operated switch and the contacts of said first relay means being connected in series with the coil of said second relay means, said second relay means having changeover contacts for supplying antiphase pulse trains.

10. An assembly according to claim 1 wherein the remote control comprises a multiposition electrical switch, the multiposition switch comprising support means, a ball and socket joint mounted on said support means, a lever which extends from said ball, a plurality of contacts arranged about an axis passing through said ball, a plurality of contact members mechanically linked to said ball so that movement of said lever to any one of a plurality of predetermined positions causes at least one of said contact members to make an electrical connection with at least one of said contacts, and switching means operable to make a further electrical contact when said lever is placed in one of its predetermined positions.

11. An assembly according to claim 10 wherein said contact members each engage a projection on said ball whereby they are mechanically linked to said ball.

12. An assembly according to claim 11 wherein said contact members are slidably mounted adjacent said ball.

13. An assembly according to claim 12 wherein said support means comprises a housing and said contacts are mounted within said housing adjacent said ball.

14. An assembly according to claim 13 wherein said contacts are arranged in pairs in said housing in a direction extending away from said ball and said contact members include bridging pieces which are moved in opposite directions, when said ball rotates, to bridge the respective pair or pairs of contacts.

15. An assembly according to claim 14 wherein said switching means comprises a pair of biased contacts arranged adjacent said ball.

16. An assembly according to claim 15 wherein said switching means comprises a push button located in the end of said first mentioned lever, said first lever containing a push rod to operate said biased contacts.

17. An assembly according to claim 10 wherein said switching means comprises a pair of biased contacts arranged adjacent the end of a second lever projecting from said ball, said biased contacts being closed by the end of said second lever when said first mentioned lever is moved into one of its predetermined positions.

18. An assembly according to claim 17 wherein said support means is in the form of a housing, said contacts being arranged as fixed contact pads on an inner wall of said housing.

19. An assembly according to claim 18 wherein said contact members comprise a pair of conductive stirrups each having a slot therein, said stirrups being pivotally mounted at their free ends and being arranged substantially perpendicular to one another so that said slots intersect and form a common recess in which the end of said second lever is received, said stirrups making an electrical connection with the respective fixed contact pads when said first lever is moved into one of its predetermined positions.

20. An assembly according to claim 1 wherein the reflective means is supported on two wedge-shaped cams which are slidably mounted, on a base plate, for movement on a common axis.

21. An assembly according to claim 20 wherein the third point of said triangle is fixed and is provided by an upstanding member attached to, or integral with said base plate.

* * * * *